(12) United States Patent
Smith et al.

(10) Patent No.: US 11,608,797 B2
(45) Date of Patent: Mar. 21, 2023

(54) HYBRID ELECTRIC ENGINE INCLUDING AUXILIARY COMPRESSOR

(71) Applicant: Raytheon Technologies Corporation, Farmington, CT (US)

(72) Inventors: Lance L. Smith, West Hartford, CT (US); Neil Terwilliger, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/355,327

(22) Filed: Jun. 23, 2021

(65) Prior Publication Data
US 2022/0412290 A1 Dec. 29, 2022

(51) Int. Cl.
| | |
|---|---|
| *B64D 27/00* | (2006.01) |
| *F02K 5/00* | (2006.01) |
| *B64D 27/16* | (2006.01) |
| *B64D 27/24* | (2006.01) |
| *F01D 15/10* | (2006.01) |
| *F02C 7/36* | (2006.01) |
| *F02C 7/32* | (2006.01) |
| *B64D 27/02* | (2006.01) |

(52) U.S. Cl.
CPC ............... *F02K 5/00* (2013.01); *B64D 27/16* (2013.01); *B64D 27/24* (2013.01); *F01D 15/10* (2013.01); *F02C 7/32* (2013.01); *F02C 7/36* (2013.01); *B64D 2027/026* (2013.01); *F05D 2220/323* (2013.01); *F05D 2220/50* (2013.01)

(58) Field of Classification Search
CPC .. B64D 27/16; B64D 27/24; B64D 2027/026; F05D 2220/323; F05D 2220/50; F01D 15/10; F02C 7/36; F02K 5/00
See application file for complete search history.

(56) References Cited

U.S. PATENT DOCUMENTS

| | | | |
|---|---|---|---|
| 4,900,231 A | 2/1990 | Kennedy | |
| 5,934,063 A * | 8/1999 | Nakhamkin | F02C 6/16 60/773 |
| 2012/0119020 A1* | 5/2012 | Burns | B64D 27/00 244/58 |
| 2015/0184593 A1* | 7/2015 | Kraft | F01D 25/10 60/782 |
| 2017/0167300 A1* | 6/2017 | Mathai | F01D 25/30 |

(Continued)

FOREIGN PATENT DOCUMENTS

| | | |
|---|---|---|
| DE | 102012015104 A1 | 1/2014 |
| EP | 3611366 A1 | 2/2020 |

OTHER PUBLICATIONS

Search Report issued in European Application No. 22180830.6; Application filed Jun. 23, 2022; dated Nov. 15, 2022 (6 pages).

*Primary Examiner* — Shafiq Mian
(74) *Attorney, Agent, or Firm* — Cantor Colburn LLP (57) ABSTRACT

A hybrid electric gas turbine engine system includes a first compressor and an auxiliary compressor. The first compressor is configured to output first compressed air. The auxiliary compressor is configured to operate in parallel with the first compressor to output second compressed air. A controller is configured to selectively activate the first compressor or the auxiliary compressor based on an operating condition of the hybrid electric gas turbine engine system.

19 Claims, 5 Drawing Sheets

(56) References Cited

U.S. PATENT DOCUMENTS

| | | | |
|---|---|---|---|
| 2017/0190441 A1* | 7/2017 | Mackin | B64D 41/00 |
| 2017/0268423 A1* | 9/2017 | Schwarz | B64D 15/04 |
| 2019/0002117 A1* | 1/2019 | Gansler | F01D 15/10 |
| 2020/0003115 A1 | 1/2020 | Jones et al. | |
| 2020/0102885 A1 | 4/2020 | Kupratis et al. | |
| 2021/0071585 A1 | 3/2021 | Kupratis et al. | |

* cited by examiner

FIG. 5

HYBRID ELECTRIC ENGINE INCLUDING AUXILIARY COMPRESSOR

BACKGROUND

Exemplary embodiments pertain to the art of gas turbine engines, and in particular to aircraft hybrid electric engines.

Conventional gas turbine engines are typically operated at an idle thrust level during taxiing from a gate to a runway and can remain at idle thrust for a substantial period of time before takeoff, which consumes a quantity of fuel prior to flight. Hybrid electric aircraft use electricity to provide a portion of the thrust needed for aircraft propulsion by converting electricity into a propulsive force. A hybrid electric aircraft can use an electric drive system (e.g., a battery system and electric motor) to support thrust generation for taxiing operations on a runway and to prevent fuel burn typical of conventional gas turbine engine idling.

BRIEF DESCRIPTION

According to a non-limiting embodiment, a hybrid electric gas turbine engine system includes a first compressor and an auxiliary compressor. The first compressor is configured to output first compressed air. The auxiliary compressor is configured to operate in parallel with the first compressor to output second compressed air. A controller is configured to selectively activate the first compressor or the auxiliary compressor based on an operating condition of the hybrid electric gas turbine engine system.

According to non-limiting embodiments, the hybrid electric gas turbine engine system provides additional features wherein in response to detecting a normal operating condition of the hybrid electric gas turbine engine system the controller deactivates the auxiliary compressor and activates the first compressor to output the first compressed air, and wherein in response to detecting an idle operating condition of the hybrid electric gas turbine engine system the controller deactivates the first compressor and activates the auxiliary compressor to output the second compressed air.

According to non-limiting embodiments, the hybrid electric gas turbine engine further comprises a gas-powered turbine configured to generate a first driving force that drives the first compressor to produce the first compressed air; an electric motor configured to generate a second driving force that drives the auxiliary compressor to produce the second compressed air; and a combustor in fluid communication with the first compressor and the auxiliary compressor, the combustor configured to combust one or both of the first compressed air and the second compressed air.

According to non-limiting embodiments, the hybrid electric gas turbine engine system provides additional features wherein the first compressor includes a low pressure section and a high pressure section, and wherein the at least a portion that is deactivated includes one of the low pressure section or the high pressure section.

According to non-limiting embodiments, the hybrid electric gas turbine engine system provides additional features wherein the least a portion of the first compressor that is deactivated is prevented from delivering compressed air to the combustor.

According to non-limiting embodiments, the hybrid electric gas turbine engine system provides additional features wherein the least a portion of the primary compressor that is deactivated is the entire first compressor.

According to non-limiting embodiments, the hybrid electric gas turbine engine system provides additional features wherein the least a portion of the first compressor that is deactivated is the high pressure section.

According to non-limiting embodiments, the hybrid electric gas turbine engine system provides additional features wherein the least a portion of the first compressor that is deactivated is the low pressure section.

According to non-limiting embodiments, the hybrid electric gas turbine engine further comprises a clutch configured to selectively engage and disengage the at least a portion of the first compressor from the first driving force, wherein the controller controls the clutch to disengage the at least a portion of the first compressor in response to detecting the idle condition so as to deactivate the least a portion of the first compressor.

According to non-limiting embodiments, the hybrid electric gas turbine engine system provides additional features wherein the main compressor and the auxiliary compressor operate at the same time, and the contributions of the first compressor and the auxiliary compressor are controlled independently from one another to achieve a targeted fuel consumption during an idle operating condition of the hybrid electric gas turbine engine system.

According to non-limiting embodiments, the hybrid electric gas turbine engine further comprises a first valve including a first inlet in fluid communication with an output of the first compressor and a first outlet in fluid communication with an input of the combustor; and a second valve including a second inlet in fluid communication with an output of the auxiliary compressor and a second outlet in fluid communication with each of the first outlet of the first valve and the input of the combustor, wherein the controller closes the first valve in response to detecting the idle condition so as to block the first compressed air from reaching the combustor.

According to non-limiting embodiments, the hybrid electric gas turbine engine system provides additional features wherein the first compressor includes a guide vane configured to selectively operate in an open position and a closed position, and wherein the controller adjusts the guide vane into the closed position in response to detecting the idle condition so as to deactivate the at least a portion of the first compressor.

According to non-limiting embodiments, the hybrid electric gas turbine engine further comprises a battery system configured to deliver power to the electric motor and induces the second driving force.

According to non-limiting embodiments, the hybrid electric gas turbine engine further comprises a generator rotatably coupled to the gas-powered turbine via a shaft assembly to receive the first driving force, and in response to receiving the first driving force generates power that powers to the electric motor and induces the second driving force.

According to non-limiting embodiments, the hybrid electric gas turbine engine system provides additional features, wherein the controller is configured to detect a normal operating condition of the hybrid electric gas turbine engine system, and in response to detecting the normal condition the controller deactivates the auxiliary compressor and activates the first compressor.

According to a non-limiting embodiment, a method of controlling an electric gas turbine engine system is provided. The method comprises operating the electric gas turbine engine system according to a current operating condition among a plurality of different available operating conditions, and selectively controlling, via a controller, a first compressor and an auxiliary compressor configured to operate in parallel with the first controller based on the hybrid electric gas turbine engine system.

According to non-limiting embodiments, the method further comprises activating, via the controller, the first controller to output first compressed air therefrom in response to detecting the current operating condition is a normal operating condition; and deactivating, via the controller, the auxiliary compressor to block output therefrom of a second compressed air.

According to non-limiting embodiments, the method further comprises delivering the first compressed air to a combustor; and combusting the first compressed air using the combustor.

According to non-limiting embodiments, the method further comprises activating, via the controller, the auxiliary controller to output second compressed air therefrom in response to detecting the current operating condition is an idle operating condition; and deactivating, via the controller, at least a portion of the first compressor to block at least a portion of the first compressed air.

According to non-limiting embodiments, the method further comprises delivering the second compressed air to the combustor; and combusting the second compressed air using the combustor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

During aircraft idle conditions such as flight idle and ground idle, for example, engine speed, temperatures, pressures and component efficiencies are much smaller than the values found during high-power operating conditions such as, for example, take-off and climbing events. For example, during idle conditions (e.g., during both ground idle and flight idle), conventional aircraft engine systems realize reduced compressor efficiency requiring an increased amount of fuel to be burned to overcome compression losses. During ground idle conditions in particular, the compressor efficiency is typically about 70%, compared to high-power operations where the compressor operates at an efficiency of about 90%.

Various non-limiting embodiments described herein provide an aircraft hybrid electric gas turbine engine system that improves compressor operating efficiency during idle conditions. The hybrid electric gas turbine engine system described herein implements a main compressor and a smaller auxiliary compressor. The auxiliary compressor is preferably configured to operate primarily during idle conditions. During idle conditions, the main compressor or a section of the main compressor (e.g., a low pressure section or a high pressure section) can be switched off (e.g., disconnected) and an electric motor can be switched on to drive the auxiliary compressor. In some embodiments, the main compressor and the auxiliary compressor can be operating at the same time, and the contributions of primary compressor and the auxiliary compressor are controlled independently from one another to achieve targeted fuel consumption during idle conditions. In either scenario, for example, the auxiliary compressor can then provide air to the engine during idle conditions without needing to expend all the fuel that would normally be used to drive the main compressor, or in some embodiments a lower amount of fuel is needed because only a section of the main compressor is being utilized. The air provided by the auxiliary compressor is then combusted with a smaller amount of fuel such that the main turbine provides power to the aircraft generator while realizing improved compressor efficiency during idle conditions.

Figure 1:
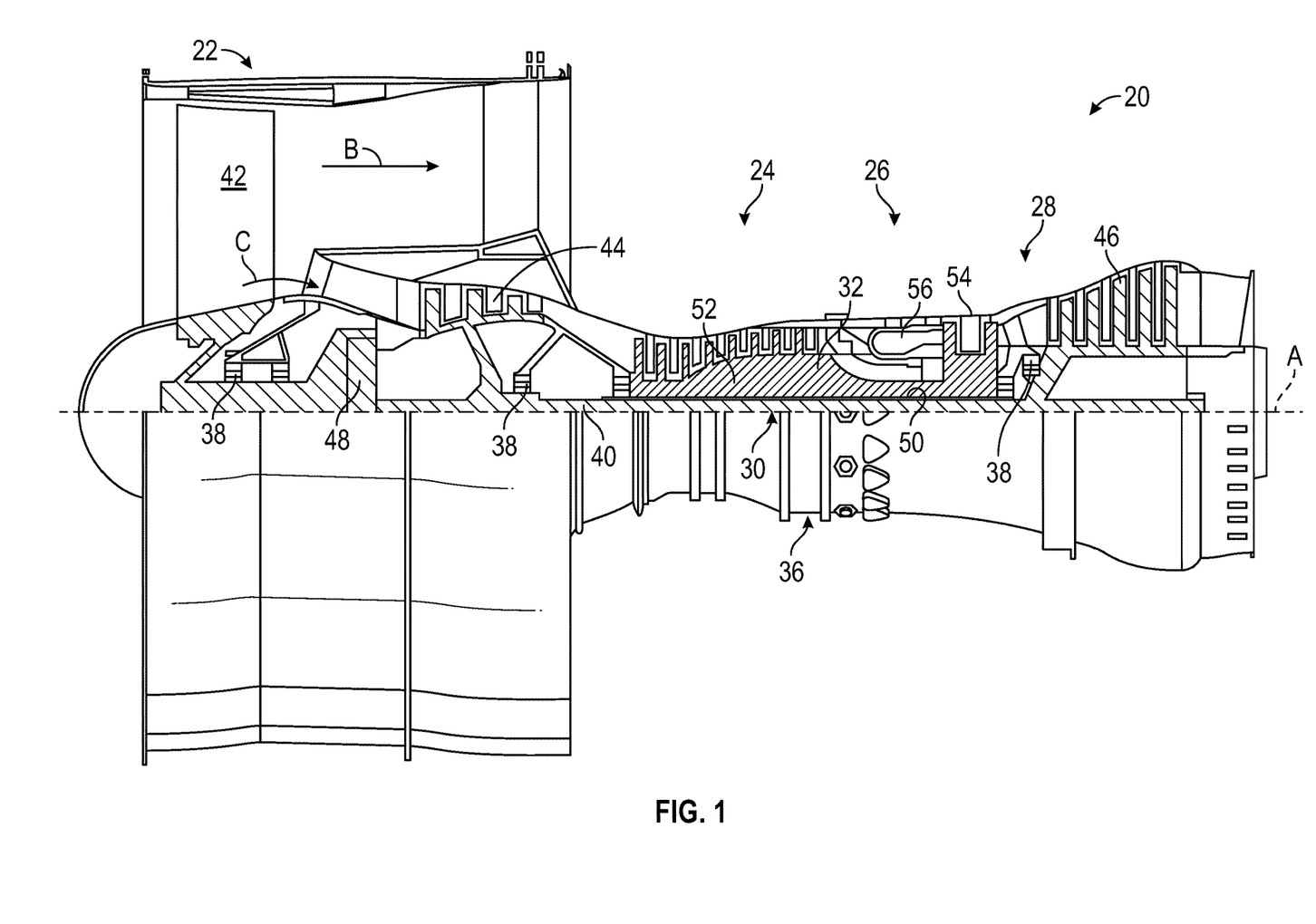
FIG. 1 a partial cross-sectional illustration of a gas turbine engine according to a non-limiting embodiment.

With reference now to FIG. 1, a gas turbine engine 20 is illustrated according to a non-limiting embodiment. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption, also known as "bucket cruise. Thrust Specific Fuel Consumption ("TSFC") is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction. In one or more non-limiting embodiments, the temperature correction can be determined according to the relationship of $[(T_{ram}° R)/(518.7° R)]^{0.5}$., where $T_{ram}$ is a ram air temperature. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
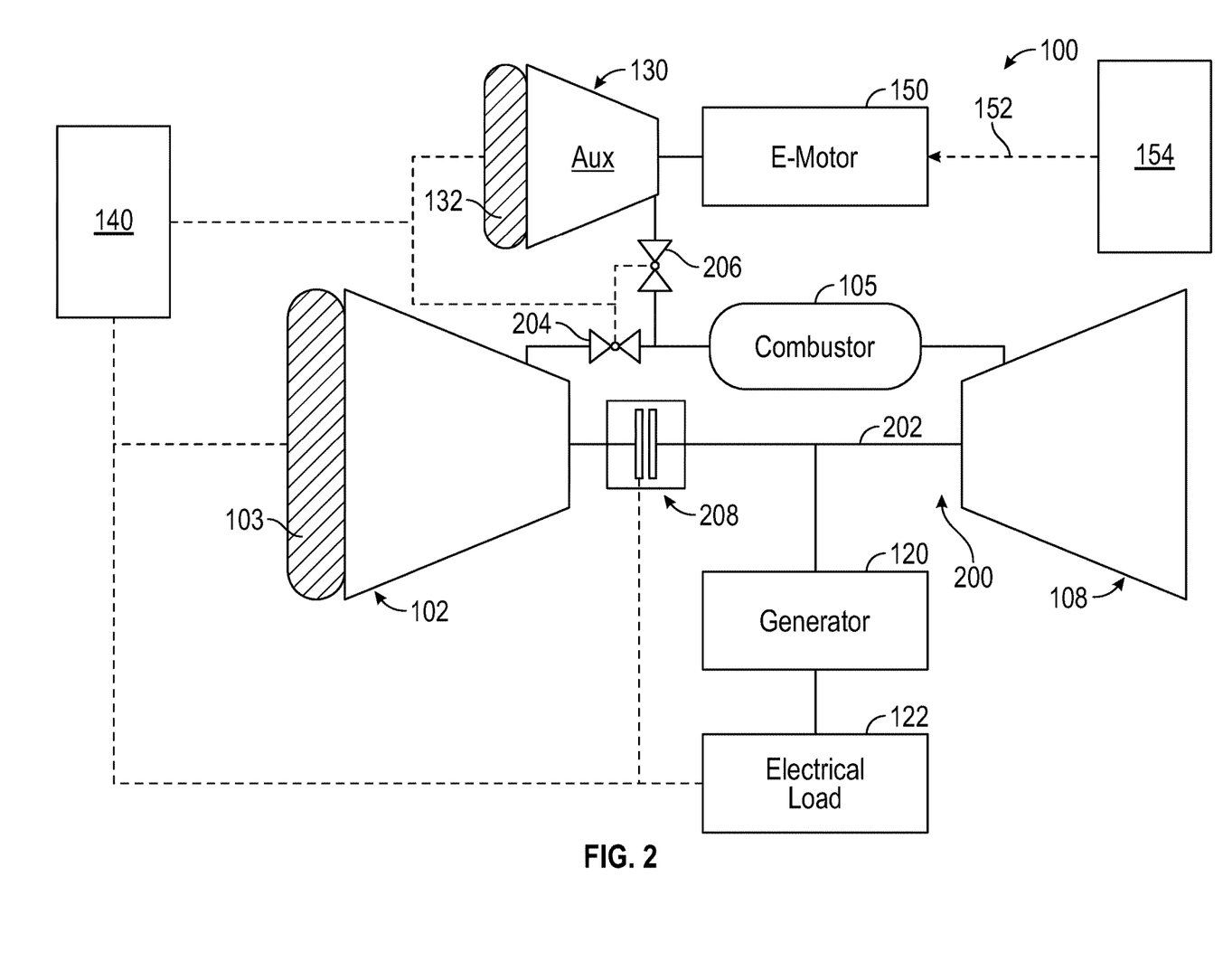
FIG. 2 is a block diagram of a hybrid electric gas turbine engine system implementing a main compressor and an auxiliary compressor according to a non-limiting embodiment.

Turning now to FIG. 2, a hybrid electric gas turbine engine system 100 including a hybrid electric gas turbine engine 200 is illustrated according to a non-limiting embodiment. The hybrid electric gas turbine engine 200 can be similar to the hybrid electric gas turbine engine 20 illustrated in FIG. 1. Therefore, some details of the hybrid electric gas turbine engine 200 will not be repeated for the sake of brevity.

The hybrid electric gas turbine engine 200 includes a primary compressor 102, a combustor 105, and a turbine 108. The primary compressor 102 and the turbine 108 are each rotatably coupled to a shaft assembly 202. The shaft assembly 202 is configured to rotate, allowing the turbine 108 to provide a driving torque to the primary compressor 102. The combustor 105 includes an input that is in fluid communication with the primary compressor 102 and an output that is in fluid communication with the turbine 108.-Pressurized air (e.g., from a bleed air source) is available at the exit of the primary compressor 102. The compressed air output from the primary compressor 102 is mixed and burned with fuel in combustor 105, and then expanded over the turbine 108.

In one or more non-limited embodiments, the primary compressor 102 includes one or more inlet guide vanes 103 that can be selectively opened and closed. When open, the primary compressor 102 is effectively activated and air can be drawn into the primary compressor 102 and compressed as described herein. When closed, however, air flow into the primary compressor is substantially blocked, or in some instances blocked completely. Accordingly, the primary compressor 102 is effectively deactivated, or at least partially deactivated.

The hybrid electric gas turbine engine system 100 further includes a generator 120, an auxiliary compressor 130, a controller 140, and an electric motor 150. The generator 120 is configured to supply electrical energy for electrical loads 122 of the aircraft. The electrical loads 122 may include, but are not limited to, electronics, engine and/or aircraft sensors, climate control systems, electric motors, lighting systems, gas turbine engine 100 support systems, weapon and/or detection systems (e.g., radar), etc.

The auxiliary compressor 130 is rotatably coupled to the electric motor 150 via a motor shaft and is in fluid communication with the combustor 105. In one or more non-limited embodiments, the auxiliary compressor 130 can be sized for smaller airflow than the primary compressor 102 and can be selectively activated when the hybrid electric gas turbine engine 200 operates in idle conditions. When, for example, the hybrid electric gas turbine engine 200 operates in an idle condition, electric power 152 can be delivered to the electric motor 150 to induce rotation of motor shaft. The electric power 152 can be provided by various power sources such as, for example, a battery system 154. Accordingly, the rotation of the motor shaft provides a driving force that initiates operation of the auxiliary compressor 130 allowing compression of air input thereto. It should be appreciated that although a battery system 154 is described as the power source in FIG. 2, a different power source such as a generator, for example, may be utilized to power the electric motor 150 without departing from the scope of the present disclosure. It should be further appreciated that the auxiliary compressor 130 can be designed and optimized for less airflow and less pressure rise than the primary compressor 102, since the auxiliary compressor is only intended to operate at a low-power or idle condition. As a result, the auxiliary compressor 130 can be designed and optimized for high compressor efficiency at low power or idle conditions, thus enabling higher engine efficiency and lower fuel burn at idle. For example, the auxiliary compressor 130 could be designed for a maximum airflow that is less than 50%, or even less than 25%, of the primary compressor 102 maximum airflow, and the auxiliary compressor 130 could also be designed for a maximum pressure rise (as measured by pressure ratio) that is less than 50%, or even less than 25%, of the primary compressor 102 maximum pressure rise (as measured by pressure ratio).

In one or more non-limited embodiments, the auxiliary compressor 130 includes one or more auxiliary inlet guide vanes 132 that can be selectively opened and closed. When the auxiliary inlet guide vane(s) 132 are open, the auxiliary compressor 130 can be activated such that air can be drawn into the auxiliary compressor 130 and compressed therein. The output compressed air is mixed and burned with fuel in the combustor 105, and then expanded over turbine 108. When closed, however, air flow into the primary compressor is substantially blocked, or in some instances is blocked completely. Accordingly, the auxiliary compressor 130 is effectively deactivated.

In one or more non-limiting embodiments, the hybrid electric gas turbine engine system 100 further includes one or more valves (sometimes referred to as blocker assemblies) in signal communication with the controller 140. A given valve can selectively operate in an open position or a closed position in response to a control signal output from the controller 140. As shown in FIG. 2, for example, the hybrid electric gas turbine engine system 100 includes a first valve includes 204 and a second valve 206. The first valve 204 has an inlet in fluid communication with the output of the primary compressor 102 and an outlet in fluid communication with the inlet of the combustor 105. The second valve 206 has an inlet in fluid communication with the output of the auxiliary compressor 130 and an outlet in fluid communication with both the outlet of the first valve 204 and the input of the combustor 105.

When the first valve 204 is open and the second valve 206 is closed, compressed air output from the primary compressor 102 is delivered to the combustor 105 while being blocked from flowing to the auxiliary compressor 130. Accordingly, the primary compressor 102 is effectively activated or at least partially activated. When the first valve 204 is closed and the second valve 206 is open, compressed air output from the primary compressor 102 is blocked from reaching combustor 105 and the auxiliary compressor 130. Accordingly, the primary compressor 102 is effectively deactivated. However, compressed air output from the auxiliary compressor 130 can be delivered to the combustor 105 via the open second valve 206.

In one or more non-limiting embodiments, the hybrid electric gas turbine engine system 100 can further include a transmission 208 couple to the shaft assembly 202, and located between the primary compressor 102 and the turbine 108. The transmission 208 can include a clutch configured to selectively engage and disengage the rotation of the primary compressor 102 with the shaft assembly 202. When the primary compressor 102 is rotatably engaged with the shaft assembly 202, it rotates along with the shaft assembly 202 and is effectively activated. When, however, the primary compressor 102 is rotatably disengaged with the shaft assembly 202, the shaft assembly 202 is allowed to rotate without rotating the primary compressor 102. Accordingly, the primary compressor 102 is effectively deactivated.

When the gas turbine engine 200 transitions into an idle condition, for example, the controller 140 can control and operate various valves, inlet guides, gearboxes/clutches included in the hybrid electric gas turbine engine system 100 to selectively activate and deactivate the primary compressor 102 (or sections thereof) and/or the auxiliary compressor 130. With reference to the example illustrated in FIG. 2, the controller 140 can control the inlet guide vane(s) 103, actuator vane(s) 132 the first and second valves 204, 206, the transmission 208, or any combination of the aforementioned components to selectively deactivate the primary compressor 102 as described herein. In addition, the electric power 152 is generated and powers the electric motor 150 to induce rotation of the motor shaft, which in turn activates and drives the auxiliary compressor 130. The compressed air output by the auxiliary compressor 130 is delivered to the combustor 105, thereby driving the turbine 108 to provide power to the generator 120 while the primary compressor 102 is deactivated. In this manner, overall engine compressor efficiency is improved while the engine 200 operates in the idle condition due to the reduced fuel consumption realized by deactivating the primary compressor 102 and using the more efficient auxiliary compressor.

Figure 3:
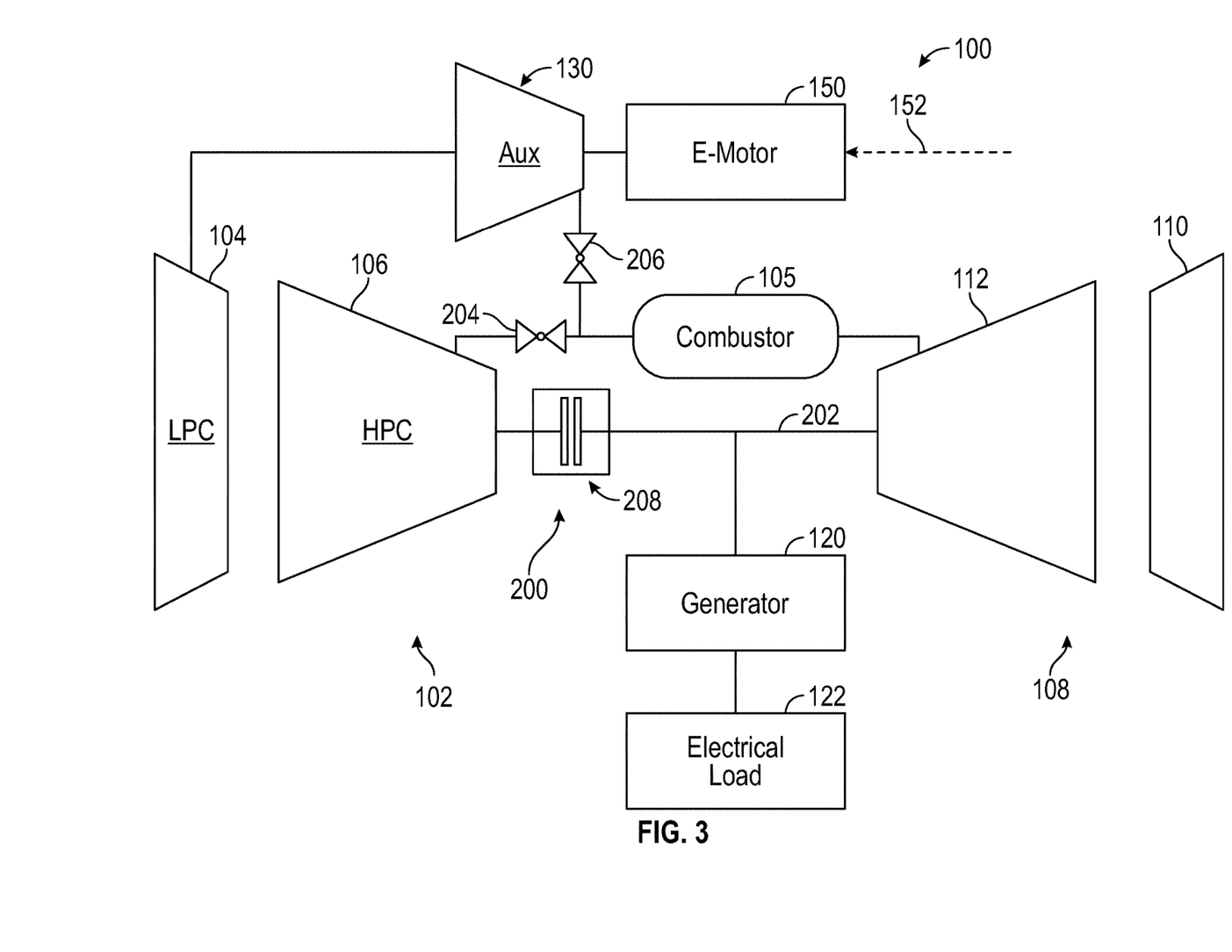
FIG. 3 is a block diagram of a hybrid electric gas turbine engine system implementing a main compressor and an auxiliary compressor according to another non-limiting embodiment.

Turning now to FIG. 3, the hybrid electric gas turbine engine system 200 is illustrated according to another non-limiting embodiment. In this example, the primary compressor 102 is implemented as a split compressor 102, while the turbine 108 is implemented as a split turbine 108. The primary compressor 102 includes a low pressure compressor section 104 and a high pressure compressor section 106. Similarly, the turbine 108 includes a low pressure turbine section 110 and a high pressure compressor section 112. The split architecture of the primary compressor 102 allows pressurized air to exit from the low pressure compressor section 104 and be delivered to the auxiliary compressor 130, while the pressurized air bypasses the high pressure compressor section 106.

In the example illustrated in FIG. 3, the auxiliary compressor 130 is still driven by an electric motor 150, which can be powered by various power sources including, but not limited to, a battery or a generator. Accordingly, the split architecture of the primary compressor 102 illustrated in FIG. 3 may utilize only a portion (e.g., the low pressure section 104) of the primary compressor 102, thereby reducing fuel consumption. In this manner, overall engine compressor efficiency is improved during idle conditions.

Figure 4:
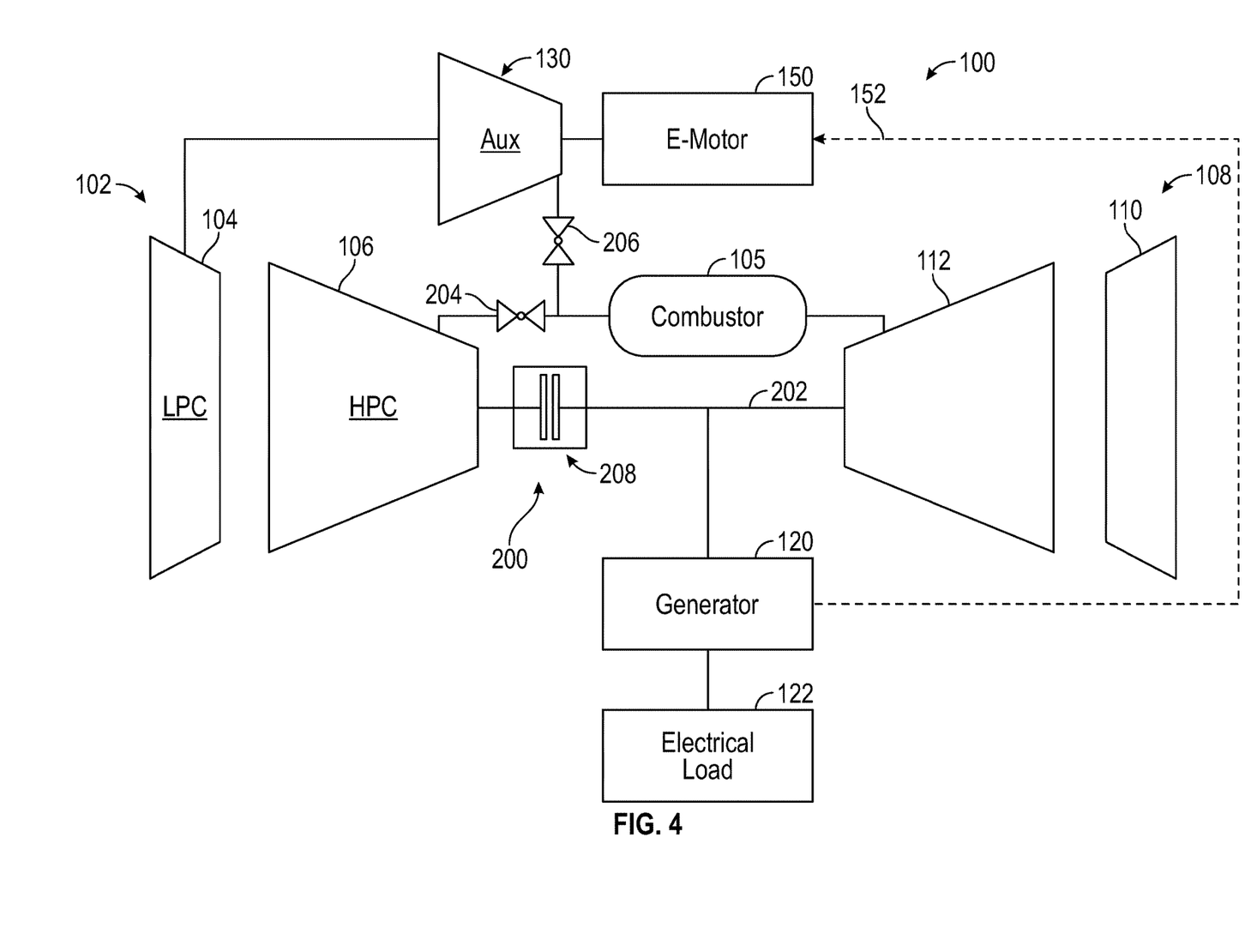
FIG. 4 is a block diagram of a hybrid electric gas turbine engine system implementing a main compressor and an auxiliary compressor according to another non-limiting embodiment.

With reference to FIG. 4, the hybrid electric gas turbine engine system 200 is illustrated according to yet another non-limiting embodiment. The hybrid electric gas turbine engine system 200 illustrated in FIG. 4 has a similar architecture to the hybrid electric gas turbine engine system 200 illustrated in FIG. 3. Therefore, some details of the hybrid electric gas turbine engine 200 will not be repeated for the sake of brevity. In this example, however, the electric motor 150 is powered by a electric power 152 output from the generator 120. The architectures illustrated in FIGS. 2, 3, and 4 allow for controlling the speed of the auxiliary compressor 130 independently of the speed of the high speed spool 32 without requiring a variable transmission. Powering the auxiliary compressor 130 using the generator 120, as shown in FIG. 4, allows this independent speed control without requiring an external power source such as a battery (with its associated weight and cost) since all compressor drive power can come from the turbine via the generator.

Figure 5:
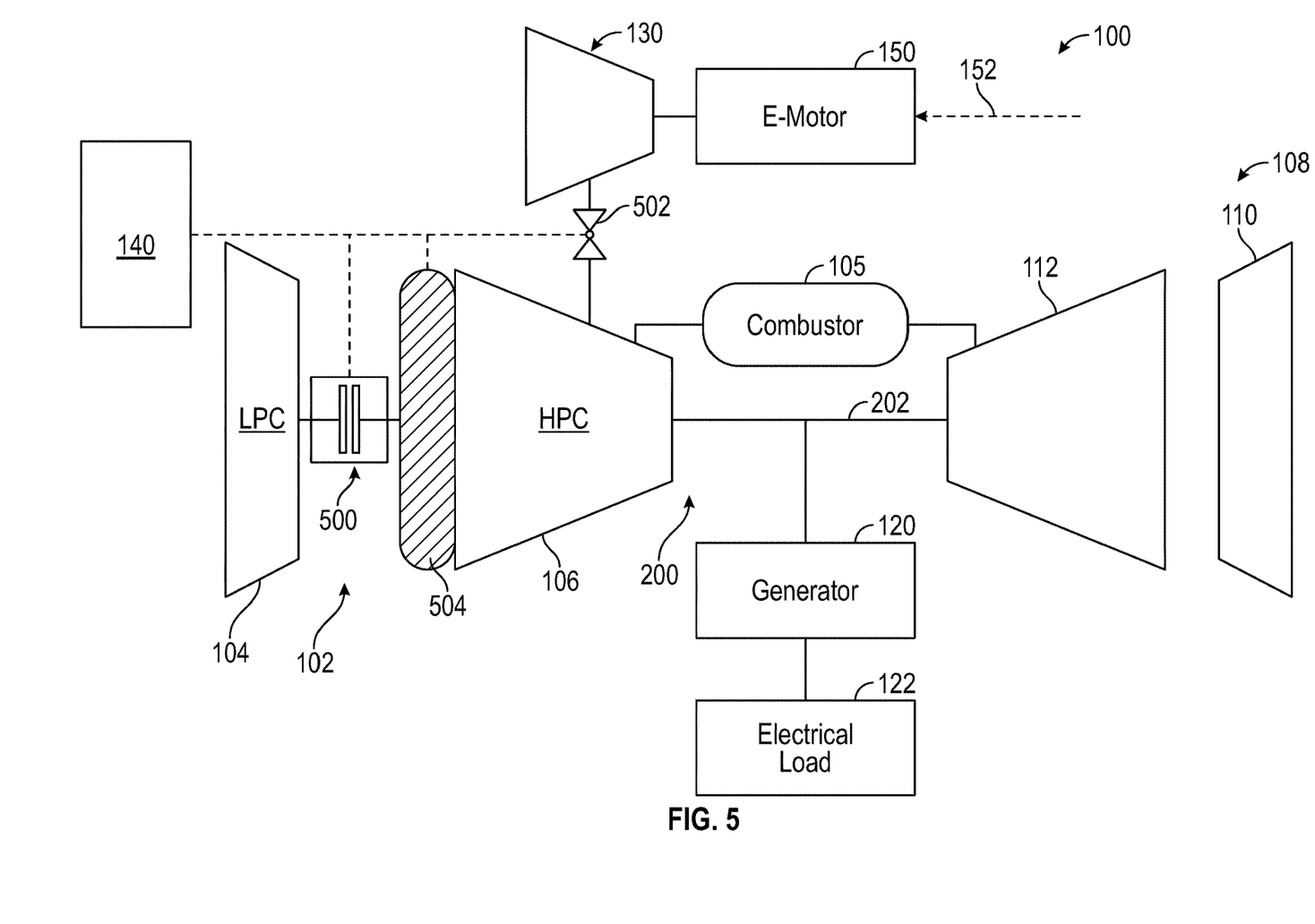
FIG. 5 is a block diagram of a hybrid electric gas turbine engine system implementing a main compressor and an auxiliary compressor according to another non-limiting embodiment.

Turning to FIG. 5, the hybrid electric gas turbine engine system 200 is illustrated according to still another non-limiting embodiment. The hybrid electric gas turbine engine system 200 illustrated in FIG. 5 also has a similar architecture to the hybrid electric gas turbine engine system 200 illustrated in FIG. 3. In this example, however, the low pressure section 104 of the primary compressor 102 is bypassed, while the high pressure section 106 receives air from the auxiliary compressor 130 and provides further compression prior to combustion.

According to a non-limiting embodiment, the hybrid electric gas turbine engine system 200 includes a transmission 500 and a valve 502. The transmission 500 includes a clutch that As described herein, the controller 140 can determine whether the hybrid electric gas turbine engine 200 is operating in above-idle conditions or idle conditions and control the transmission 500 and/or the valve 502 accordingly.

The transmission 500 is located between the low pressure section 104 and the high pressure section 106, and includes a clutch that is configured to selectively engage and disengage the rotation of the low pressure section 104 with the shaft assembly 202. When the low pressure section 104 is rotatably engaged with the shaft assembly 202 (e.g. during normal operating conditions), it rotates along with the shaft assembly 202 and is effectively activated. Accordingly, airflow input to the low-pressure section 104 undergoes a first compression and the compressed output air is delivered to the high pressure section 106 to undergo increased compression before being delivered to the combustor 105.

When engine idle conditions are detected, the controller 140 commands the transmission 500 to disengage the low pressure section 104 from the shaft assembly 202 via the clutch. Accordingly, the shaft assembly 202 is allowed to rotate and drive the high pressure section without rotating the low pressure section 104. In this manner, the low pressure section 104 is effectively deactivated while the high-pressure section 106 remains activated.

The valve 502 is located between the output of the auxiliary compressor 130 and the input of the high pressure compressor 106, and is configured to selectively operate in an open position and a closed position. During normal engine operating conditions, the valve 502 can be closed to block the air flow path between the auxiliary compressor 130 and the high pressure section 106.

When engine idle conditions are detected, however, the valve 502 can be opened to facilitate air flow between the auxiliary compressor 130 and the high pressure section 106. In addition, when engine idle conditions are detected the electric power 152 can be delivered to the electric motor 150 to induce rotation of motor shaft. As described herein, the electric power 152 can be provided by various power sources including, but not limited to, a battery and a generator (e.g., generator 120). The rotation of the motor shaft initiates operation of the auxiliary compressor 130. Accordingly, air input to the auxiliary compressor is compressed and the compressed output air is delivered to the high pressure section 106, where the air compression is increased before being output to the combustor 105. Accordingly, only the high pressure section 106 of the primary compressor 102 may be utilized. In this manner, fuel consumption is reduced and overall engine compressor efficiency is improved during idle conditions.

In one or more non-limiting embodiments, the high pressure section 106 can include one or more high pressure vanes 504. When the hybrid electric gas turbine engine 200 operates during an idle condition, the controller 140 can close the high pressure vane(s) 504. In this manner, the compressed air provided by the auxiliary compressor 130 is prevented from exiting the inlet of the high pressure section 106, thereby improving the compression efficiency of the high pressure section 106.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric gas turbine engine system comprising:
   a first compressor configured to output first compressed air;
   an auxiliary compressor configured to operate in parallel with the first compressor to output second compressed air;
   a controller configured to selectively activate the first compressor or the auxiliary compressor based on an operating condition of the hybrid electric gas turbine engine system,
   wherein in response to detecting a non-idle operating condition of the hybrid electric gas turbine engine system the controller deactivates the auxiliary compressor and activates the first compressor to output the first compressed air, and
   wherein in response to detecting an idle operating condition of the hybrid electric gas turbine engine system the controller deactivates the first compressor and activates the auxiliary compressor to output the second compressed air.

2. The hybrid electric gas turbine engine system of claim 1, further comprising:
   a gas-powered turbine configured to generate a first driving force that drives the first compressor to produce the first compressed air;
   an electric motor configured to generate a second driving force that drives the auxiliary compressor to produce the second compressed air; and
   a combustor in fluid communication with the first compressor and the auxiliary compressor, the combustor configured to combust one or both of the first compressed air and the second compressed air.

3. The hybrid electric gas turbine engine of claim 2, wherein the first compressor includes a low pressure section and a high pressure section, and wherein the at least a portion that is deactivated includes one of the low pressure section or the high pressure section.

4. The hybrid electric gas turbine engine of claim 3, wherein the least a portion of the first compressor that is deactivated is prevented from delivering compressed air to the combustor.

5. The hybrid electric gas turbine engine of claim 3, wherein the least a portion of the primary compressor that is deactivated is the entire first compressor.

6. The hybrid electric gas turbine engine of claim 3, wherein the least a portion of the first compressor that is deactivated is the high pressure section.

7. The hybrid electric gas turbine engine of claim 1, wherein the least a portion of the first compressor that is deactivated is the low pressure section.

8. The hybrid electric gas turbine engine system of claim 2, further comprising a clutch configured to selectively engage and disengage the at least a portion of the first compressor from the first driving force, wherein the controller controls the clutch to disengage the at least a portion of the first compressor in response to detecting the idle condition so as to deactivate the least a portion of the first compressor.

9. The hybrid electric gas turbine engine system of claim 1, wherein the first compressor and the auxiliary compressor operate at the same time, and the contributions of the first compressor and the auxiliary compressor are controlled independently from one another to achieve a targeted fuel consumption during an idle operating condition of the hybrid electric gas turbine engine system.

10. The hybrid electric gas turbine engine system of claim 7, further comprising:
a first valve including a first inlet in fluid communication with an output of the first compressor and a first outlet in fluid communication with an input of the combustor; and
a second valve including a second inlet in fluid communication with an output of the auxiliary compressor and a second outlet in fluid communication with each of the first outlet of the first valve and the input of the combustor,
wherein the controller closes the first valve in response to detecting the idle condition so as to block the first compressed air from reaching the combustor.

11. The hybrid electric gas turbine engine system of claim 2, wherein the first compressor includes a guide vane configured to selectively operate in an open position and a closed position, and wherein the controller adjusts the guide vane into the closed position in response to detecting the idle condition so as to deactivate the at least a portion of the first compressor.

12. The hybrid electric gas turbine engine system of claim 2, further comprising a battery system configured to deliver power to the electric motor and induces the second driving force.

13. The hybrid electric gas turbine engine system of claim 2, further comprising a generator rotatably coupled to the gas-powered turbine via a shaft assembly to receive the first driving force, and in response to receiving the first driving force generates power that powers to the electric motor and induces the second driving force.

14. The hybrid electric gas turbine engine system of claim 2, wherein the controller is configured to detect the non-idle operating condition of the hybrid electric gas turbine engine system, and in response to detecting the non-idle operating condition the controller deactivates the auxiliary compressor and activates the first compressor.

15. A method of controlling an electric gas turbine engine system, the method comprising:
operating the electric gas turbine engine system according to a current operating condition among a plurality of different available operating conditions;
selectively controlling, via a controller, a first compressor and an auxiliary compressor configured to operate in parallel with the first compressor, by;
in response to detecting that the current operating condition is a non-idle operating condition, activating, via the controller, the first compressor to output first compressed air therefrom; and
in response to detecting that the current operating condition is an idle operating condition, activating, via the controller, the auxiliary compressor to output second compressed air therefrom.

16. The method of claim 15, further comprising:
in response to detecting that the current operating condition is the non-idle operating condition, deactivating, via the controller, the auxiliary compressor to block output therefrom of a second compressed air.

17. The method of claim 16, further comprising:
delivering the first compressed air to a combustor; and
combusting the first compressed air using the combustor.

18. The method of claim 17, further comprising:
in response to detecting that the current operating condition is the idle operating condition, deactivating, via the controller, at least a portion of the first compressor to block at least a portion of the first compressed air.

19. The method of claim 17, further comprising:
delivering the second compressed air to the combustor; and
combusting the second compressed air using the combustor.

* * * * *